(No Model.)

W. E. McCHORD.
CAR COUPLING.

No. 411,997. Patented Oct. 1, 1889.

WITNESSES:

INVENTOR:
W. E. McChord
BY Munn & Co.
ATTORNEYS.

UNITED STATES PATENT OFFICE.

WILLIAM C. McCHORD, OF SPRINGFIELD, KENTUCKY.

CAR-COUPLING.

SPECIFICATION forming part of Letters Patent No. 411,997, dated October 1, 1889.

Application filed July 25, 1889. Serial No. 318,636. (No model.)

*To all whom it may concern:*

Be it known that I, WILLIAM C. MCCHORD, of Springfield, in the county of Washington and State of Kentucky, have invented a new and Improved Car-Coupler, of which the following is a full, clear, and exact description.

This invention relates to car-couplers of the class illustrated, described, and claimed in Letters Patent of the United States No. 405,495, granted to me on the 18th day of June, A. D. 1889, the main objects of the present invention being to relieve the coupling-hook from all undue strain and to provide for the easy uncoupling of the cars, a further object of the invention being to construct the coupler so that the ordinary coupling-link—such as is used with a pin-and-link coupling—may be employed in connection with my improved car-coupler.

Reference is to be had to the accompanying drawings, forming a part of this specification, in which similar figures and letters of reference indicate corresponding parts in all the views.

Figure 1:
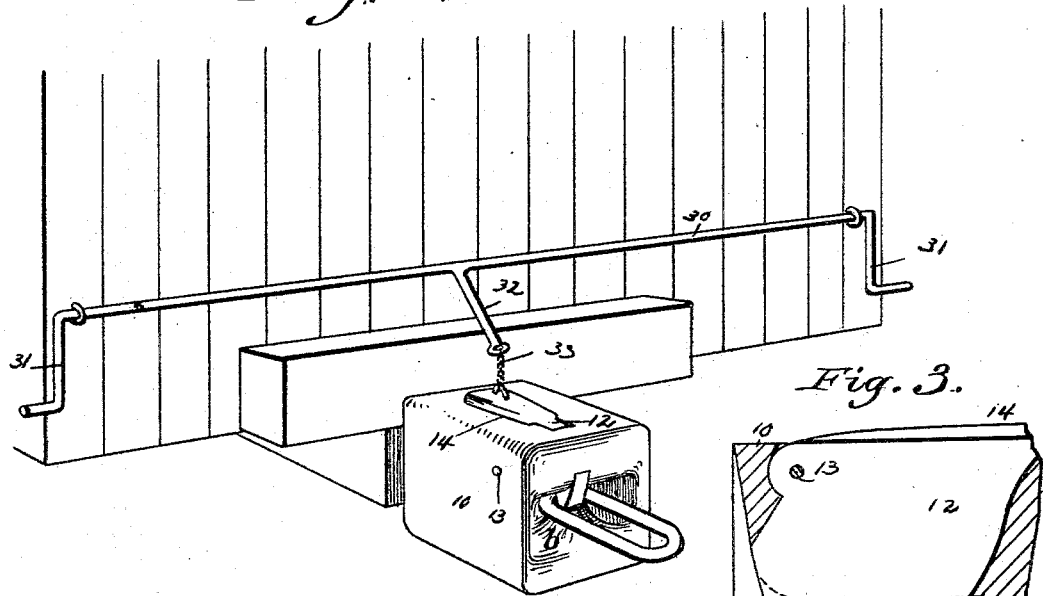
Figure 3:
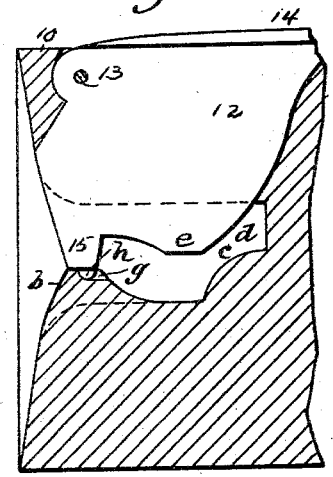
Figure 2:
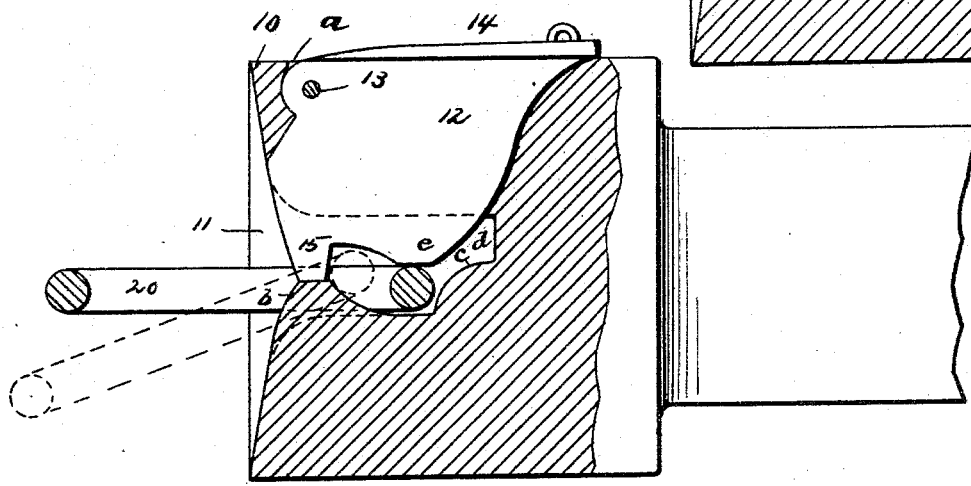

Figure 1 is a perspective view of my improved coupler. Fig. 2 is an enlarged detail view, the draw-head being shown in section; and Fig. 3 is a similar view of a modified construction.

In the drawings, 10 represents a draw-head, through the upper wall of which there is formed a slot $a$, which extends into the link-recess 11. Within the slot $a$, I mount a catch 12, said catch being supported by a pivot pin or bolt 13, that is arranged as shown. To the upper edge of the catch I secure a plate 14, which overlaps the recess $a$ and prevents the entrance of snow, hail, or dust. The above-described construction is substantially that illustrated in the patent above referred to.

In carrying out my present invention I form the draw-head with an upwardly-extending projection $b$, upon which the coupling-hook 15 rests, and to the rear of the projection $b$, I form the draw-head with a shoulder $c$, beyond which there is a slight recess $d$. The catch 12, I form with a downwardly-extending projection $e$, which rests upon the inner end of the link 20 and acts to hold said link in a horizontal position, and between the hook 15 and projection $e$ the catch is cut away transversely, as represented in the drawings.

In order that the catch 12 may be raised to uncouple the cars, I mount a horizontal rod on shaft 30, as represented in Fig. 1, the ends of said rod or shaft being cranked to form crank arms or handles 31, there being a crank-arm 32, which extends out from the center of the bar to a point over the rear end of the catch, to which catch the arm 32 is connected by a chain or link 33, the arrangement being such that by turning up the crank-arms 31 the catch may be raised, so as to carry the hook 15 away from the projection $b$ to allow the link 20 to be withdrawn from the draw-head recess.

By means of the above construction it follows that when the link 20 is subjected to a tensile strain it will fit closely about the projection $b$, leaving the hook 15 clear, so that the catch may be readily moved to the uncoupling position; and in moving to the uncoupling position the shoulder $c$ will prevent all undue backward movement on the link, and the recess $d$ will provide for the freeing of the hook from the link.

In Fig. 3 I illustrate a construction wherein the projection $b$ is formed with a recess $g$, and the hook 15 with a projection $h$, which fits within said recess. This construction serves more thoroughly to relieve the hook from all undue strain.

The coupler above described provides for the use of the ordinary coupling-link, and that, too, in connection with the ordinary pin-and-link coupler.

Having thus described my invention, I claim as new and desire to secure by Letters Patent—

1. In a car-coupler, the combination, with a draw-head formed with a projection $b$, of a pivotally-mounted catch formed with a hook 15 and a projection $e$, and a cut-out portion between said hook and projections, substantially as described.

2. In a car-coupler, the combination, with a draw-head formed with a projection $b$, a shoulder $c$, and a recess $d$, of a catch 12, formed with a hook 15 and a projection $e$, and a cut-out portion between said hook and projections, substantially as described.

WILLIAM C. McCHORD.

Witnesses:
W. F. BOOKER,
ROBERT ROE.